United States Patent

Chu

[11] Patent Number: 5,912,798
[45] Date of Patent: Jun. 15, 1999

[54] DIELECTRIC CERAMIC FILTER

[75] Inventor: Te-Yi Chu, Hsin Chu Hsien, Taiwan

[73] Assignee: Landsten Chu, Tao Yuan Hsien, Taiwan

[21] Appl. No.: 08/887,223

[22] Filed: Jul. 2, 1997

[51] Int. Cl.⁶ .................................................. H01G 4/06
[52] U.S. Cl. .................................... 361/321.3; 361/321.5; 333/185
[58] Field of Search ............................ 361/321.3, 306.2, 361/321.1, 321.5, 321.4; 333/202, 185, 189, 207, 206, 182, 183, 184; 310/321, 358, 369, 340; 455/200, 11.1, 20; 29/25.35

[56] References Cited

U.S. PATENT DOCUMENTS

| | | | |
|---|---|---|---|
| 4,511,202 | 4/1985 | Kasi | 333/189 |
| 5,495,215 | 2/1996 | Newell et al. | 333/202 |
| 5,515,017 | 5/1996 | Yamada et al. | 333/207 |
| 5,614,875 | 3/1997 | Jang et al. | 333/202 |

*Primary Examiner*—Kristine Kincaid
*Assistant Examiner*—Anthony Dinkins
*Attorney, Agent, or Firm*—Birch, Stewart, Kolasch & Birch, LLP

[57] ABSTRACT

A dielectric ceramic filter of the type which can be applied on high frequency application is provided. The filter includes a ceramic resonator and at least a ceramic capacitor. The ceramic capacitor is disposed between two adjacent resonators. The ceramic filtering capacitor includes a non-metal plate which has been coated with conductive coatings at the upper and lower surfaces respectively. A non-conducting material (or a strong dielectric membrane) having a dielectric coefficient is coated and disposed between said conductive coatings and it can be used in high frequency applications. Wherein the pass band of the filter can be readily defined or modified according to the system such that the signal pass band can be increased or decreased and the impedance rating of the signal can be optimally set to fifty (50) ohms.

9 Claims, 8 Drawing Sheets

DIELECTRIC CERAMIC FILTER

FIELD OF THE INVENTION

The present invention relates to a dielectric ceramic material which applies dielectric coupling coating to modify and adapt the capacity between two adjacent resonators which are interconnected by a ceramic filtering capacitor. The pass band of this filter can be readily modified according to the definition of the system or the user. By this arrangement, the impedance rating of the signal can be optimally set to fifty (50) ohms.

DESCRIPTION OF PRIOR ART

The conventional pass band filter for the radio frequency is configured by a pair of resonators interconnected by a ceramic resonating element in serial, as clearly shown in FIG. 7. This conventional ceramic resonator has an elongated cube having six surfaces. The operation of this resonator is based on the transmission electrical magnetic resonation. The response characteristic curve is shown in FIG. 8. From this characteristic curve, it can be readily found that the Q value is around five (5) dBm. It has a comparatively low coupling value. Furthermore, it can not be modified or adapted according to the system or the user to increase or decrease the signal pass band. Consequently, the impedance rating can not be controlled within the optimal ranges.

SUMMARY OF THE INVENTION

It is the objective of this invention to provide a dielectric ceramic filter in which the coupling capacity between two adjacent resonators can be suitably modified or adapted by a non-metal material disposed therebetween. As a result, the pass band of this filter can be readily adapted or modified according to the system or the user. As a result, the impedance rating of the signal can be optimally set to fifty (50) ohms.

According to one aspect of this invention, the ceramic filtering capacitor includes a non-metal plate which has been coated with conductive coatings at the upper and lower surfaces respectively. A non-conducting material having a dielectric coefficient is coated and disposed between the conductive coatings and it can be used on high frequency application.

According to still another aspect of the present invention, the ceramic filter can be applied on the transmitting port of the cable or wireless of the radio frequency or microwave system, such as the Personal Communication System (PCS), the Global Position System, the Cordless Phone, the Satellite Communication system, the Cellular Phone, the Base Station, the Cable TV and etc. and the dielectric ceramic filter can be also used on transmitting port of the radio frequency or microwave on the cable or wireless system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In order that the present invention may more readily be understood the following description is given, merely by way of example with reference to the accompanying drawings, in which.

DETAILED DESCRIPTION OF PREFERRED EMBODIMENT

Figure 1:
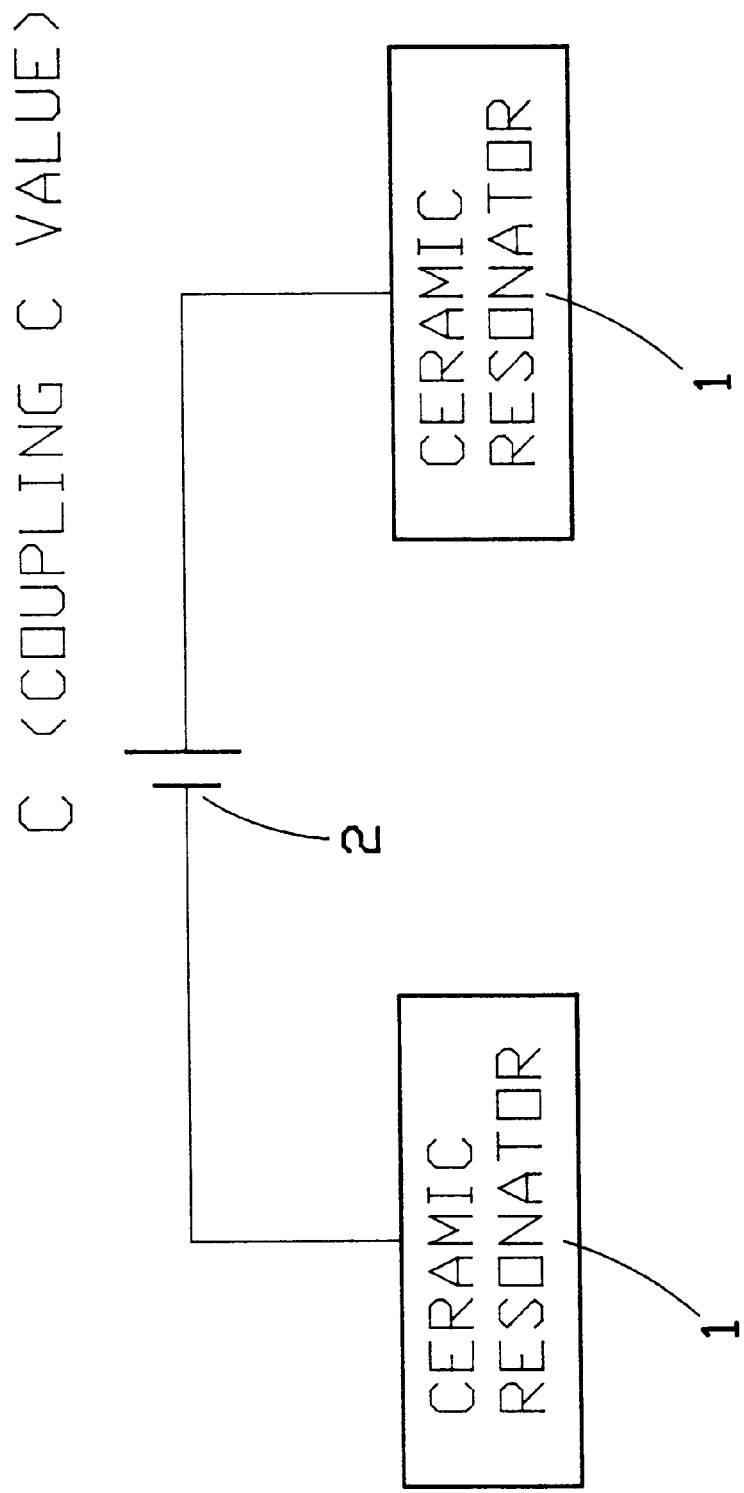
FIG. 1 is a circuitry of the filter made according to the present invention.
Figure 2:
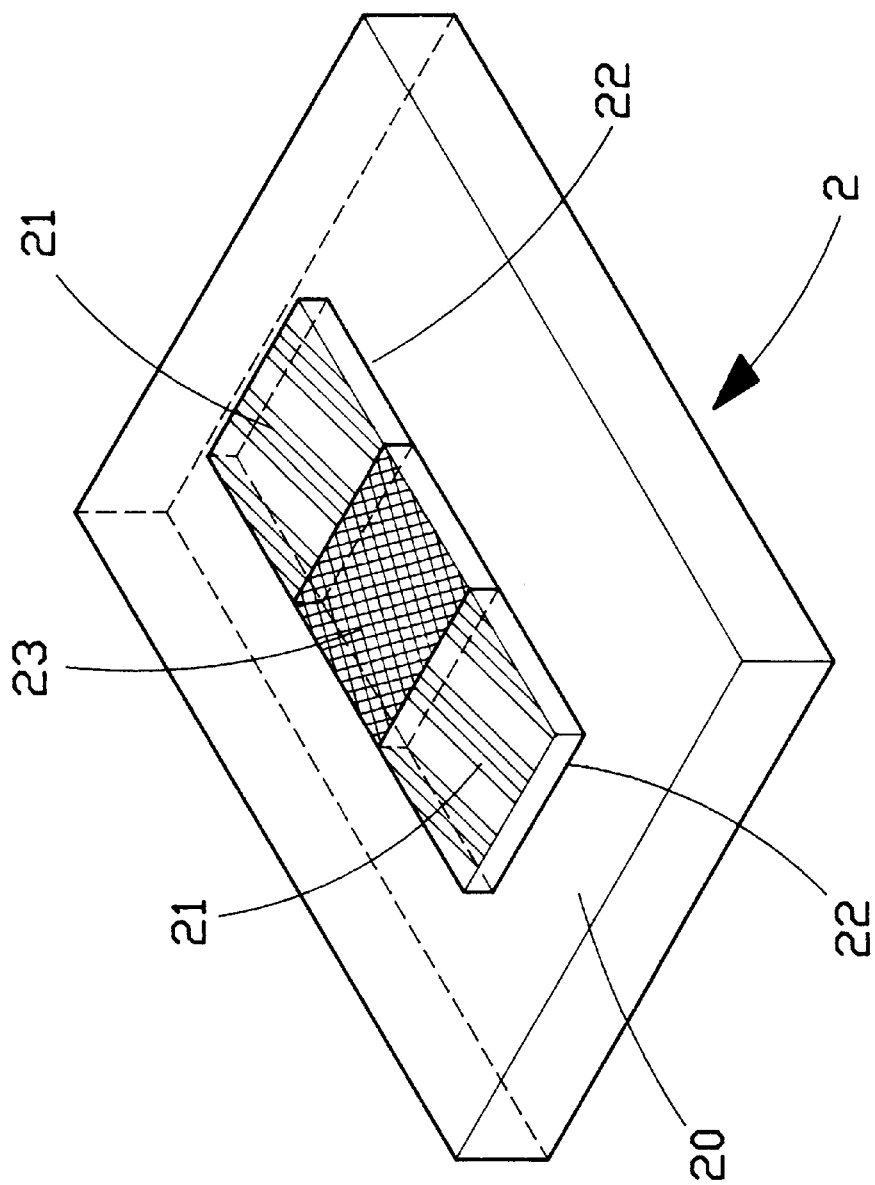
FIG. 2 is a perspective view of the dielectric ceramic filter made according to the present invention.

Referring to FIGS. 1 and 2, the dielectric ceramic filter is configured at least by a resonator 1 and a ceramic filtering capacitor 2. The ceramic filtering capacitor 2 is interconnected between two adjacent resonators 1. By this arrangement, the coupling capacity between two adjacent ceramic resonators 1 can be readily adapted and modified by the non-metal disposed therebetween. The capacity of the ceramic filtering capacitor 2 is proportional to the dielectric coefficient $\epsilon$, in light of this, when different dielectric material is used, the capacity can be readily varied.

The ceramic filtering capacitor 2 is disposed on a non-metal plate 20, for example, a ceramic plate. The ceramic plate 20 is coated with conductive coatings 21, 22 at the upper and lower surfaces respectively. A non-conducting material 23 having a dielectric coefficient is coated and disposed between those conductive coatings 21, 22. The non-metal material can be a barium trioxide ($BaO_3$). By this arrangement, it can be used in high frequency applications.

Figure 3:
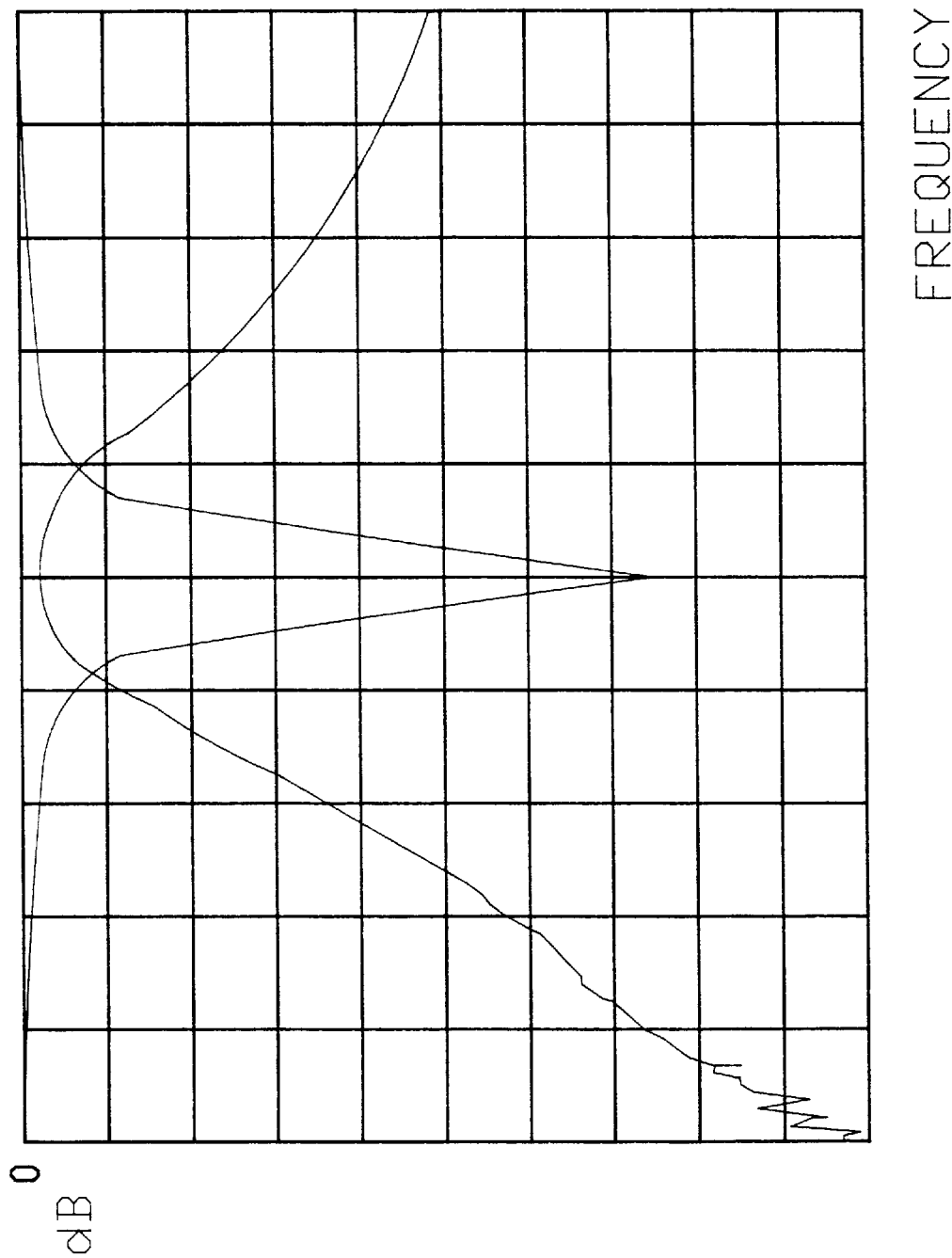
FIG. 3 is a characteristic chart of the frequency-amplitude of the dielectric ceramic filter.

Referring to FIG. 3, a characteristic chart of the frequency-amplitude of the ceramic resonator and the dielectric ceramic filter is disclosed. It can be readily appreciated that the pass band of the ceramic filter can be readily modified or adapted by the user or defined by the system. As a result, the signal pass band can be increased or reduced. By this arrangement, the impedance rating of the signal can be optimally set at fifty (50) ohms.

Figure 4:
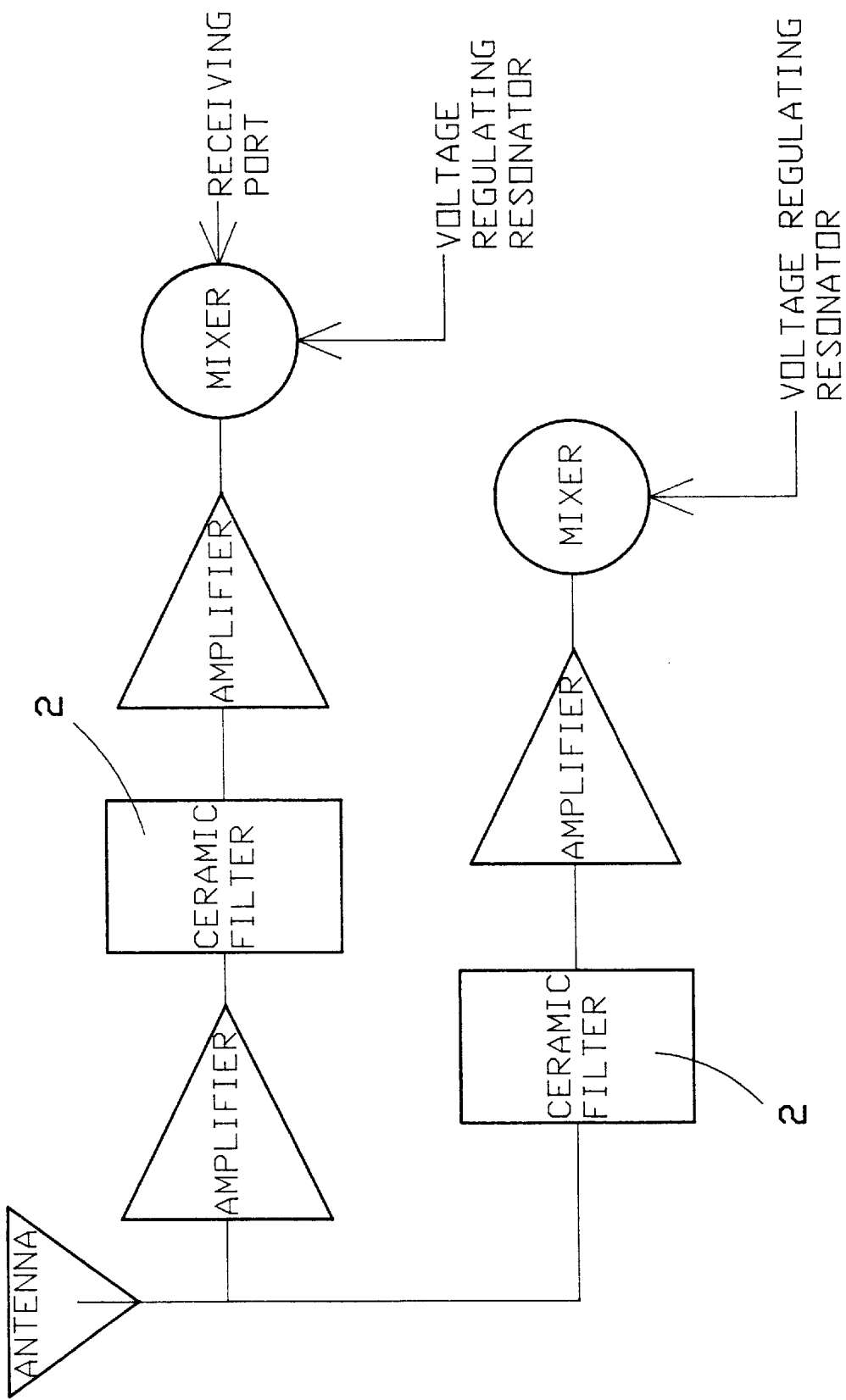
FIG. 4 is a block diagram of an embodiment of the dielectric ceramic filter applied on the radio frequency.
Figure 5:
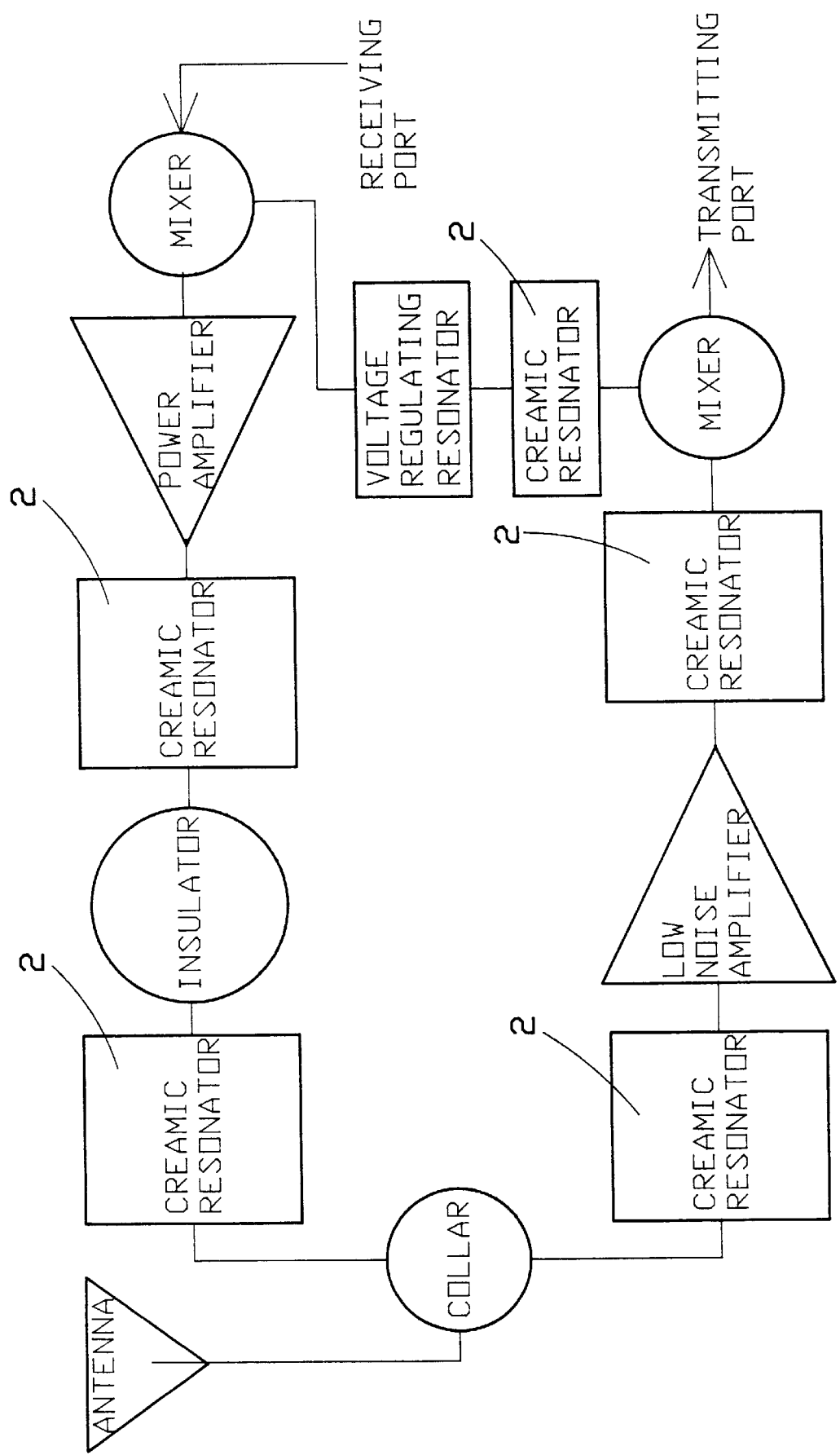
FIG. 5 is a block diagram of another embodiment of the dielectric ceramic filter applied on the radio frequency.
Figure 6:
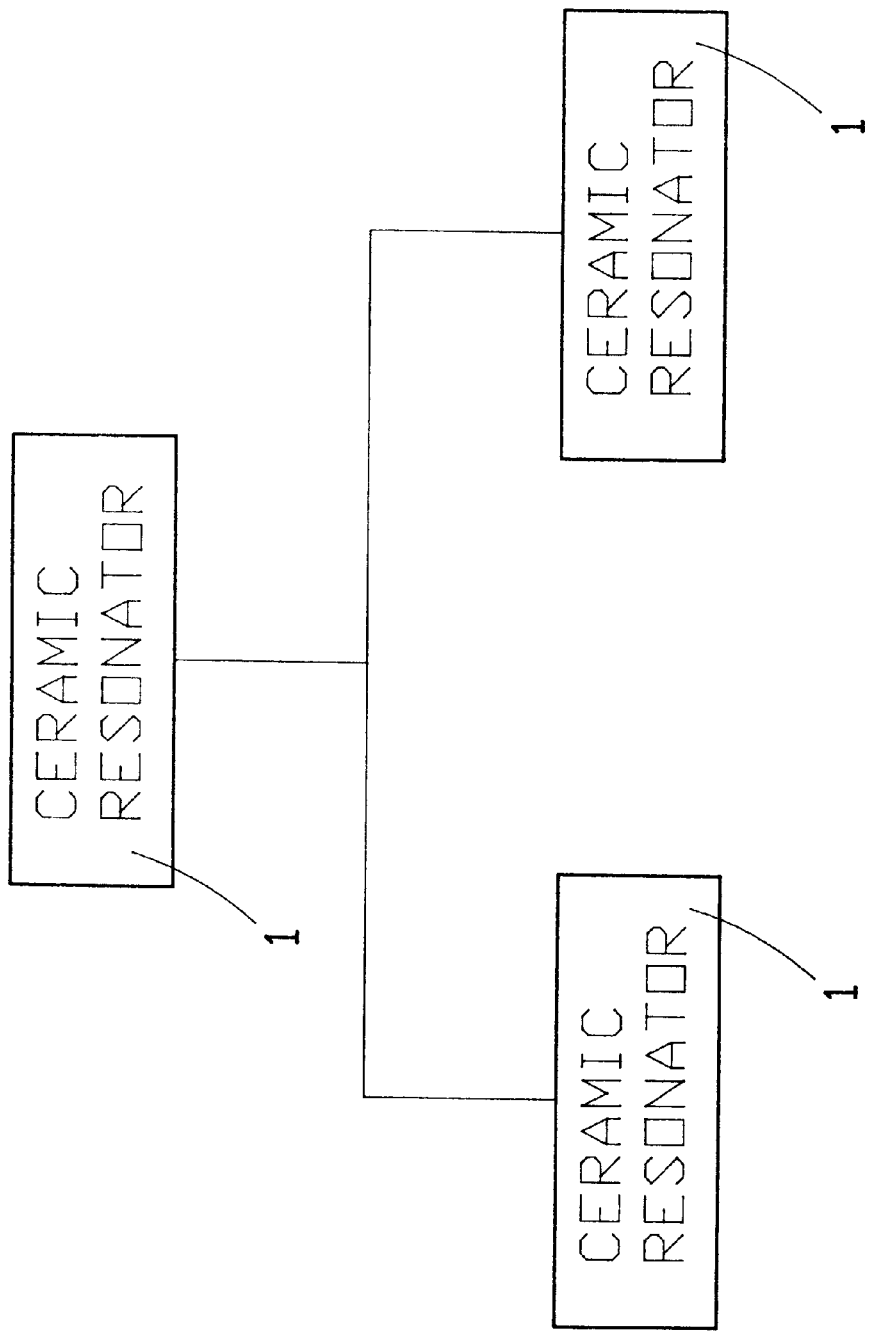
FIG. 6 is a block diagram of a conventional filter.
Figure 7:
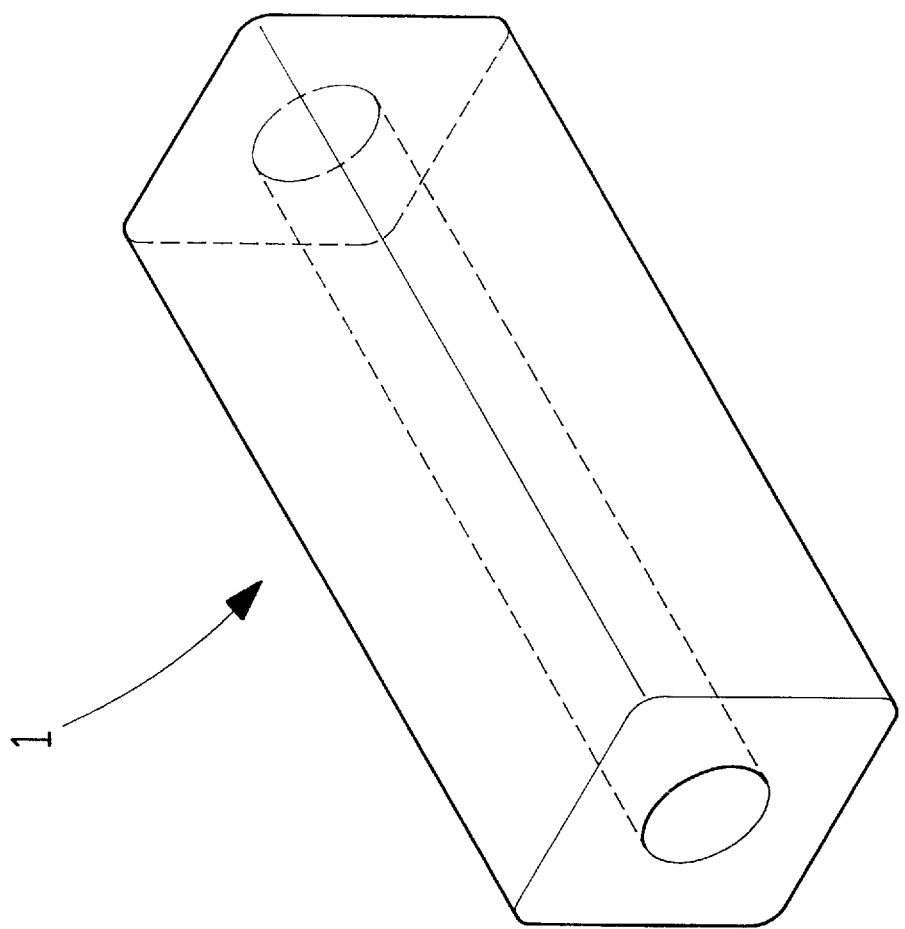
FIG. 7 is a perspective view of a conventional ceramic resonator.
Figure 8:
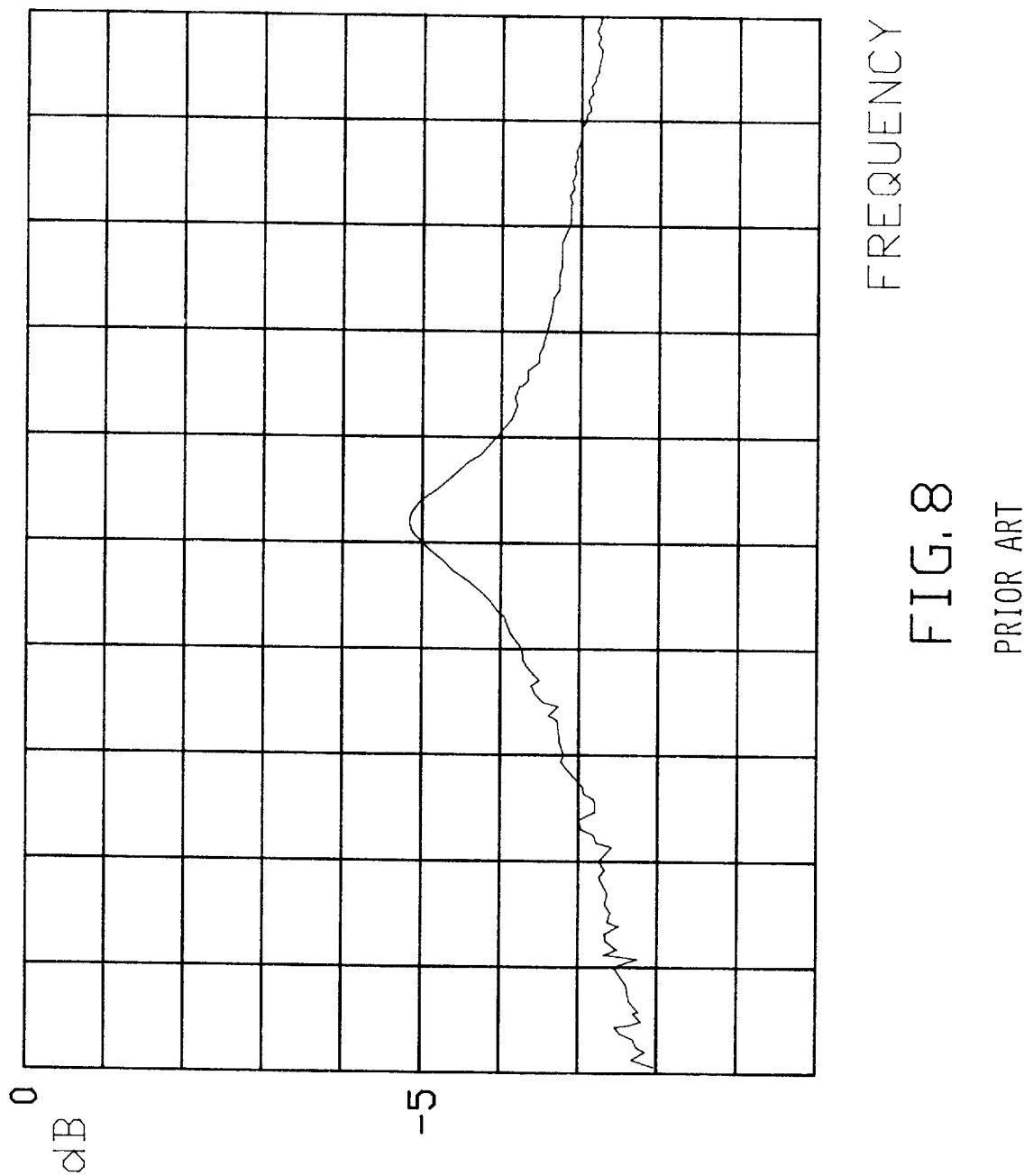
FIG. 8 is a characteristic chart of the ceramic resonator of FIG. 7.

By the foregoing description, this ceramic filter can be applied on the transmitting port of the cable or wireless of the radio frequency or microwave system, such as the Personal Communication System (PCS), the Global Position System (GPS), the Cordless Phone, the Satellite Communication system, the Cellular Phone, the Base Station, the Cable TV, and etc. The dielectric ceramic filter can be also used on a transmitting port of the radio frequency or microwave on the cable or wireless system. On the other hand, it can also be applied on the receiving port of the radio frequency and microwave frequency. As clearly shown in FIGS. 4 and 5.

By the forgoing description, the coupling capacity between two ceramic resonators can be readily modified and adapted by a non-metal material disposed therebetween.

While a particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

I claim:

1. A dielectric ceramic filter for high frequency applications, said filter comprising at least two ceramic resonators and at least a ceramic capacitor, the ceramic capacitor being connected between the two resonators such that a coupling capacity between the two resonators is readily modifiable, a pass band of the ceramic capacitor is readily definable or modifiable such that a signal pass band of the dielectric ceramic filter is increasable or decreasable and an impedance rating of the dielectric filter is set optimally to approximately fifty ohms.

2. The dielectric ceramic filter as recited in claim 1, wherein the ceramic filter is used on a transmitting port of a cable or wireless system, the system being a radio frequency or microwave system.

3. The dielectric ceramic filter as recited in claim 2, wherein the cable or wireless system is one of a personal communication system, global position system, cordless phone, satellite communication system, cellular phone, base station and cable television.

4. The dielectric ceramic filter as recited in claim 1, wherein the ceramic filter is used on a receiving port of a cable or wireless system, the system being a radio frequency or microwave system.

5. The dielectric ceramic filter as recited in claim 4, wherein the cable or wireless system is one of a personal communication system, global position system, cordless phone, satellite communication system, cellular phone, base station and cable television.

6. The dielectric ceramic filter as recited in claim 1, wherein the ceramic filter is used on both a transmitting port and receiving port of a cable or wireless system, the system being a radio frequency or microwave system.

7. The dielectric ceramic filter as recited in claim 6, wherein the cable or wireless system is one of a personal communication system, global position system, cordless phone, satellite communication system, cellular phone, base station and cable television.

8. A dielectric ceramic filter for high frequency applications, said filter comprising:

at least two ceramic resonators; and at least a ceramic capacitor, the ceramic capacitor being connected between the two resonators such that a coupling capacity between the two resonators is readily modifiable, a pass band of the ceramic capacitor is readily definable or modifiable such that a signal pass band of the dielectric ceramic filter is increasable or decreasable and an impedance rating of tie dielectric filter is set optimally to approximately fifty ohms, wherein a non-metallic material and an insulating material are mounted on the ceramic capacitor, the non-metallic material being a strong dielectric membrane.

9. A dielectric ceramic filter for high frequency applications, said filter comprising:

at least two ceramic resonators; and at least a ceramic capacitor, the ceramic capacitor being connected between the two resonators such that a coupling capacity between the two resonators is readily modifiable, a pass band of the ceramic capacitor is readily definable or modifiable such that a signal pass band of the dielectric ceramic filter is increasable or decreasable and an impedance rating of the dielectric filter is set optimally to approximately fifty ohms, wherein the ceramic capacitor includes a non-metallic plate coated with conductive coatings and a non-conducting material, the non-conducting material having a dielectric coefficient and being disposed between the conductive coatings on the non-metallic plate, both an upper and lower surface of the non-metallic plate being coated with the conductive coatings and non-conducting material.

* * * * *